US012715232B2

(12) United States Patent
Gotschewski

(10) Patent No.: US 12,715,232 B2
(45) Date of Patent: Aug. 25, 2026

(54) PRESSURE MECHANISM FOR HOLDING A POSITION OF A PRINTHEAD

(71) Applicant: ZEBRA TECHNOLOGIES CORPORATION, Lincolnshire, IL (US)

(72) Inventor: Robert P. Gotschewski, Schaumburg, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/518,020

(22) Filed: Nov. 3, 2021

(65) Prior Publication Data

US 2023/0133136 A1 May 4, 2023

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS

| | | | | |
|---|---|---|---|---|
| 3,915,281 | A | 10/1975 | Blomquist et al. | |
| 6,795,671 | B2 * | 9/2004 | Matsuoka | G03G 15/0194 399/223 |
| 10,913,483 | B2 * | 2/2021 | Huber | B62D 1/195 |
| 2006/0162508 | A1 * | 7/2006 | Liu | B25G 1/085 81/439 |
| 2013/0113858 | A1 | 5/2013 | Gotschewski | |
| 2017/0225496 | A1 * | 8/2017 | Gotschewski | B41J 25/312 |
| 2020/0324561 | A1 | 10/2020 | Takahashi | |

OTHER PUBLICATIONS

International Search Report and Written Opinion for International Application No. PCT/US2022/48650 mailed on Feb. 9, 2023.

* cited by examiner

*Primary Examiner* — Alejandro Valencia

(57) ABSTRACT

A pressure mechanism is disclosed. The pressure mechanism may include an actuator that is configured to be rotatable about a support axis between a first position and a second position. The actuator may include a sleeve with a cam that is disposed on an end of the actuator. The pressure mechanism may include a retainer that is slidable within the sleeve based on a position of the actuator, and the retainer may include a tooth. A tooth surface of the tooth may be configured to slide, as the assembly is rotated between the first position and the second position, along a cam surface of the cam in an axial direction that is parallel to the support axis.

3 Claims, 7 Drawing Sheets

PRESSURE MECHANISM FOR HOLDING A POSITION OF A PRINTHEAD

TECHNICAL FIELD

The present disclosure relates generally to a printhead and, for example, to a pressure mechanism for controlling a position of a printhead.

BACKGROUND

A printhead of a printer may include an assembly with a mechanism that is configured to apply pressure toward a platen (or other surface) of the printer during a printing operation. Over time, debris may accumulate within the printer, within or on the printhead, and/or on the platen. Accordingly, there is a need for the mechanism to be adjustable to enable a user to easily perform maintenance on the printhead (e.g., to clean a roller of the platen, clean the printhead, address a media/paper jam, or the like), replace the printhead, and/or return the printhead to an operational position.

DETAILED DESCRIPTION

Figure 1:
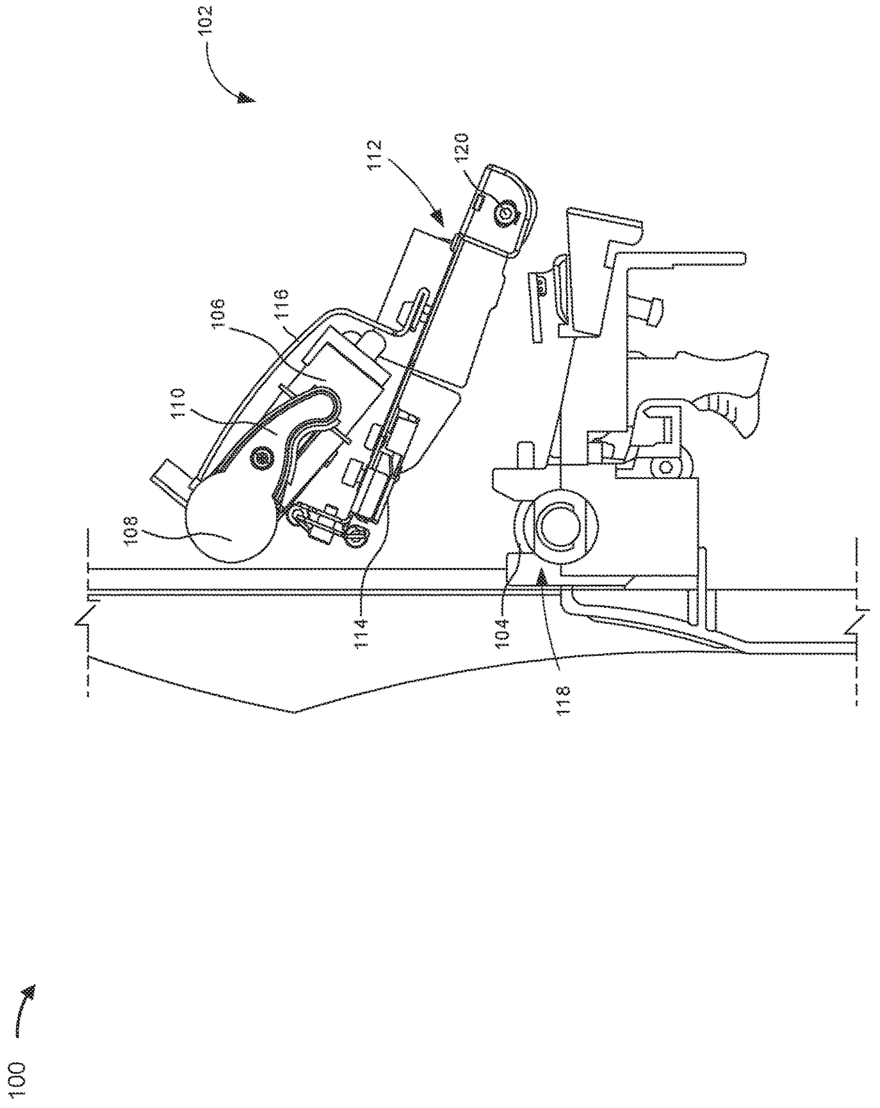
FIG. 1 is a diagram of an example implementation of a print mechanism of a printer described herein.

The following detailed description of example implementations refers to the accompanying drawings. The same reference numbers in different drawings may identify the same or similar elements.

A toggle assembly of a print mechanism of a printer may allow for maintenance on the print mechanism and/or other components of the printer. For example, the toggle assembly may enable the print mechanism to be rotatable between a closed position for printing and an open position for access to one or more components of the printer (e.g., a platen or other components that may be inaccessible when the print mechanism is in the closed position). The toggle assembly, when in an open position (e.g., to correspondingly place the print mechanism in the open position), may reduce a pressure applied by a printhead of the print mechanism relative to the toggle assembly (and/or print mechanism) being in the closed position for printing. In some cases, the toggle assembly when rotated toward the open position is to be lifted upward, away from a print surface (e.g., a platen surface or other surface that receives or supports media during a printing operation) of the printer. Due to physical aspects of the toggle assembly and/or print mechanism, unless the toggle assembly is held in the open position by the user, the toggle assembly may return (or fall) back to the closed position (e.g., due to the toggle assembly being rotated upward, due to the print mechanism being lifted upward, and/or due to the weight of the print mechanism). Accordingly, the user may only have use of one hand or may need to prop the toggle assembly and/or the print mechanism in the open position using a tool or other object, which can cause damage to the print mechanism and/or other components of the printer.

Some implementations described herein provide a pressure mechanism for a print mechanism that is configured to hold a position of the print mechanism in either a closed position (e.g., a first position) or an open position (e.g., a second position). For example, the pressure mechanism may include an actuator and a retainer that is slidable within a sleeve of the actuator. The pressure loaded retainer may include one or more teeth that are to slide along a cam when the actuator is rotated between the closed position and the open position. The retainer may be spring loaded to cause, when being rotated away from the open position, the pressure mechanism to return to the closed position once a tooth surface of the tooth is slid into contact with the cam. In this way, the pressure mechanism and/or print mechanism may be configured to enable access to internal components without requiring additional support from a user or object in an open position, thereby improving accessibility for maintenance and/or facilitating maintenance on the print mechanism and/or other components of the printer. Furthermore, the pressure mechanism may ensure that the print mechanism is returned to the closed position, thereby ensuring that a desired amount of pressure is applied by the print mechanism during printing.

FIG. 1 is a diagram of an example implementation 100 of a print mechanism 102 of a printer described herein. As shown in FIG. 1, the print mechanism 102 is in an open position and is configured to enable access (e.g., through creating space) to a platen 104 or other components beneath the print mechanism 102 (e.g., to facilitate maintenance on the print mechanism 102, the platen 104, and/or other components of the printer). The platen 104 may receive or support media (e.g., paper or other type of material) during a printing operation to enable the printer to print content to the media via the print mechanism 102 according to the printing operation.

The print mechanism 102 includes a web pressure mechanism 106, an actuator 108, a handle 110, a printhead carrier 112 that includes a printhead 114, and a connection strap 116. The platen 104 may be supported by a platen support frame 118. The web pressure mechanism 106 may be configured to apply pressure toward the printhead 114 (e.g., when the print mechanism 102 is in a closed position), as described herein.

The connection strap 116 may be attached to the handle 110 and the printhead carrier 112. Accordingly, when the actuator 108 is rotated in association with the handle 110, the connection strap 116 may cause the printhead carrier 114 to pivot about a pivot axis 120. In this way, when the handle 110 is moved between an open position and a closed position, the print mechanism 102 may correspondingly move between the open position and a closed position.

Figure 2:
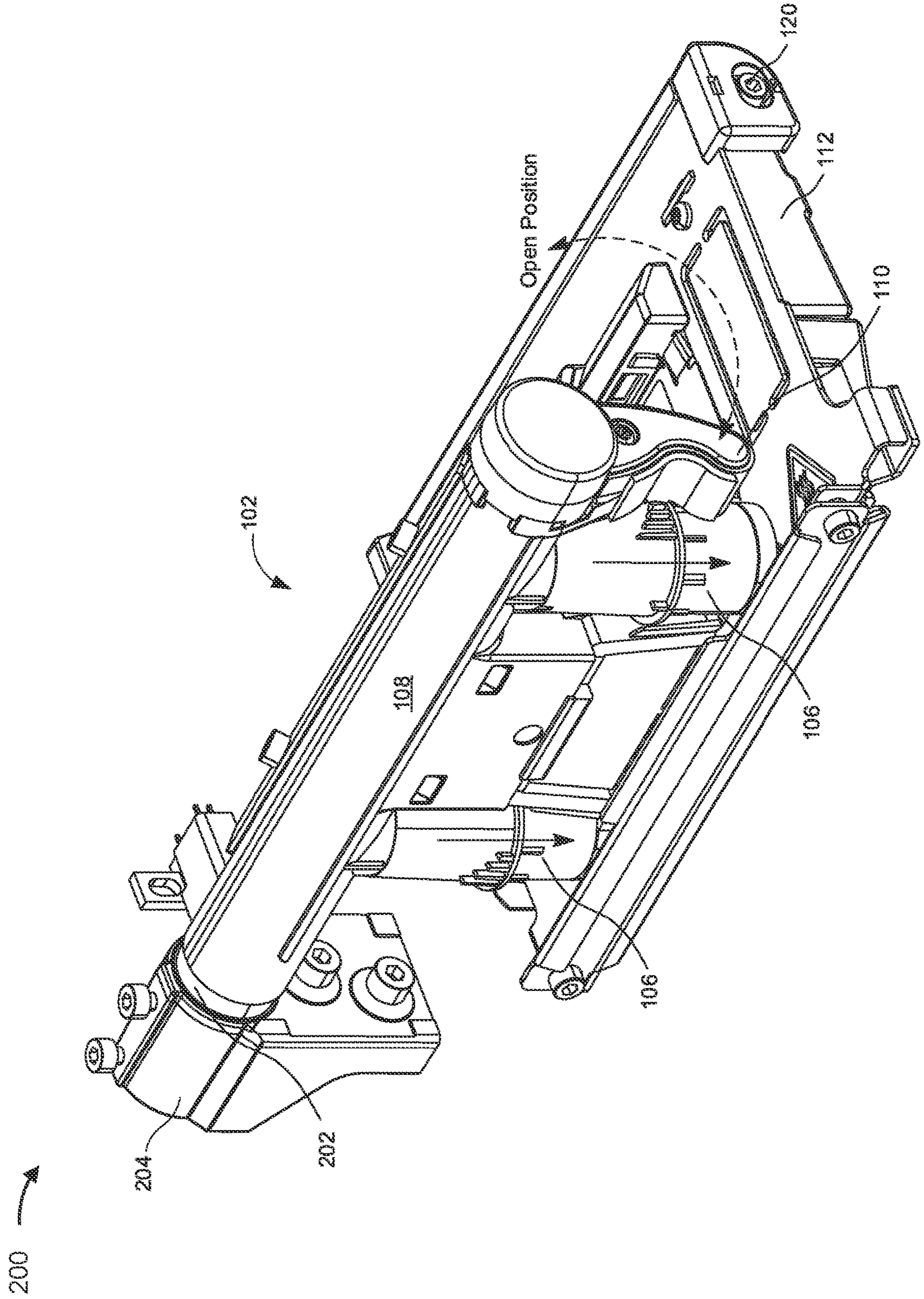
FIG. 2 is a diagram of an example implementation of a print mechanism described herein.

FIG. 2 is a diagram of an example implementation 100 of the print mechanism 102. As shown in FIG. 2, the print mechanism 102 is in a closed position (e.g., a first position) and configured to provide pressure toward the platen 104 during a printing operation to enable the printhead 114 to print content on media supported by the platen 104.

The print mechanism 102 may apply the pressure via one or more of the web pressure mechanisms 106 (downward pressure as indicated by solid arrows). As described herein, the actuator 108 of the print mechanism 102 may include a handle 110 (or toggle) that enables a user to rotate (as shown by a dotted arrow) the actuator 108 between the closed position and the open position (e.g., a second position) of the print mechanism 102 (e.g., to allow the user to access the platen 104 or other components obstructed by the print mechanism 102). The actuator 108 may be attached to or supported by a support member 202 (e.g., a cylindrical shaft or other suitably shaft support) of a support frame 204 of the print mechanism 102 that enables the actuator 108 to rotate about a support axis of the support member 202, as described elsewhere herein.

Figure 3:
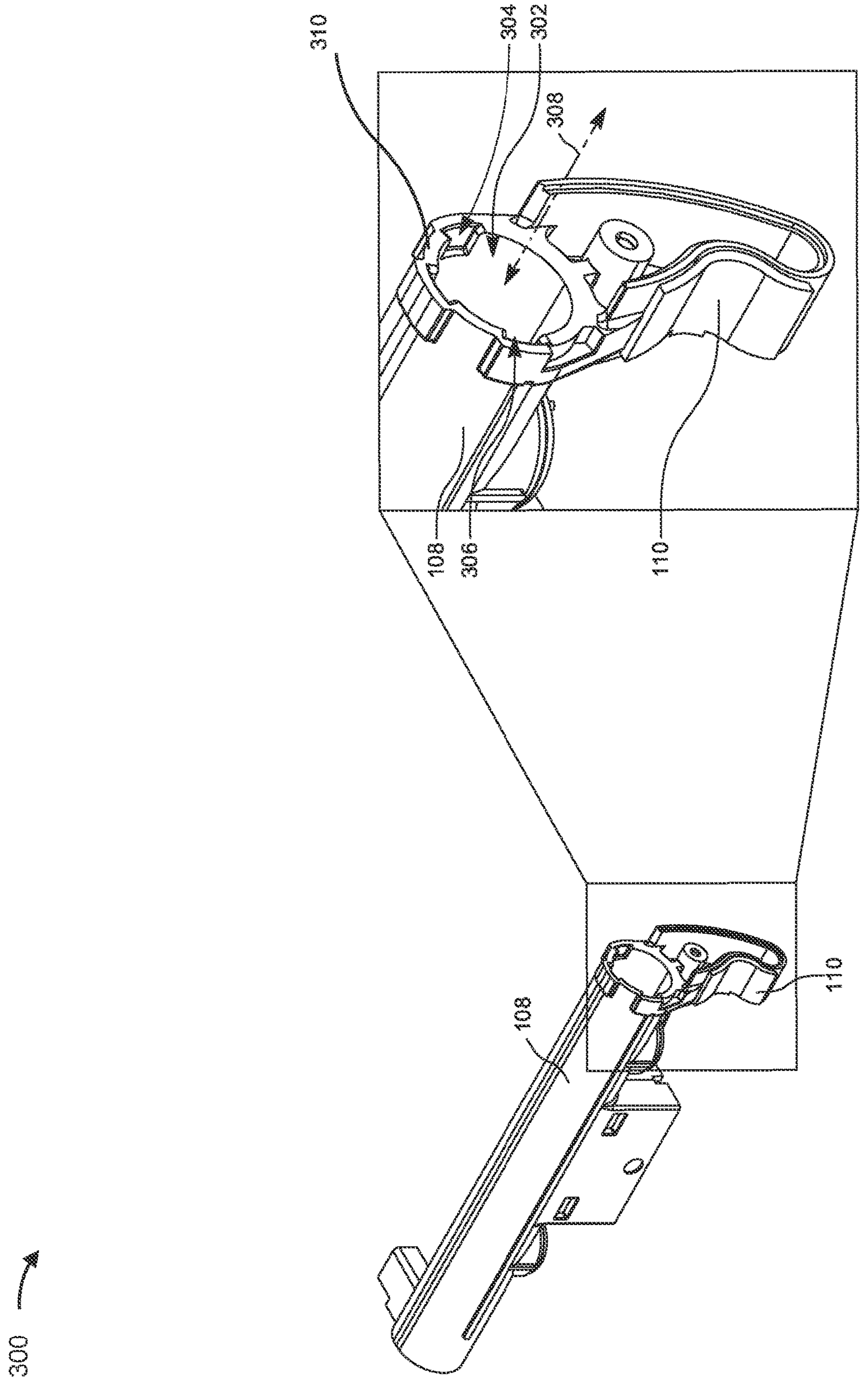
FIG. 3 is a diagram of an example implementation of an actuator described herein.

FIG. 3 is a diagram of an example implementation 300 of the actuator 108 of the print mechanism 102. As shown, the actuator 108 may include a sleeve 302 that is configured to receive a retainer that is described elsewhere herein. The sleeve 302 includes a recess 304 that is disposed on an end of the actuator 108. The recess 304 of the sleeve 302 may include an edge that serves as a cam 306 (or other appropriately shaped surface), as described herein. The cam 306, due to being in contact with a tooth of a retainer of the print mechanism 102, to cause the retainer to rotate about a support axis 308 of the support member 202. The support axis 308 may correspond to a rotational axis of the actuator 108. As described elsewhere herein, the retainer may slide into the recess 304 or out of the recess 304 when the actuator 108 is rotated between the open position and closed position, respectively.

The cam 306 of the actuator 108 may be disposed on a handle end 310 of the actuator 108 to permit a portion of the retainer (e.g., a tooth or a surface of the tooth) to move into the sleeve 302 (e.g., within an opening plane of the sleeve 302) or out of the sleeve 302 (e.g., outside of the opening plane of the sleeve 302).

In some implementations, the actuator 108 may include different recesses in different configurations that enable the retainer to be received (or locked) into different positions when the actuator 108 is in the open position and in the closed position. For example, the sleeve 302 may include a first recess to receive a tooth of the retainer in the closed position and a second recess to receive the tooth of the retainer in the open position. In some implementations, one or more of the recesses may correspond to a surface of the handle end 310.

Figure 4:
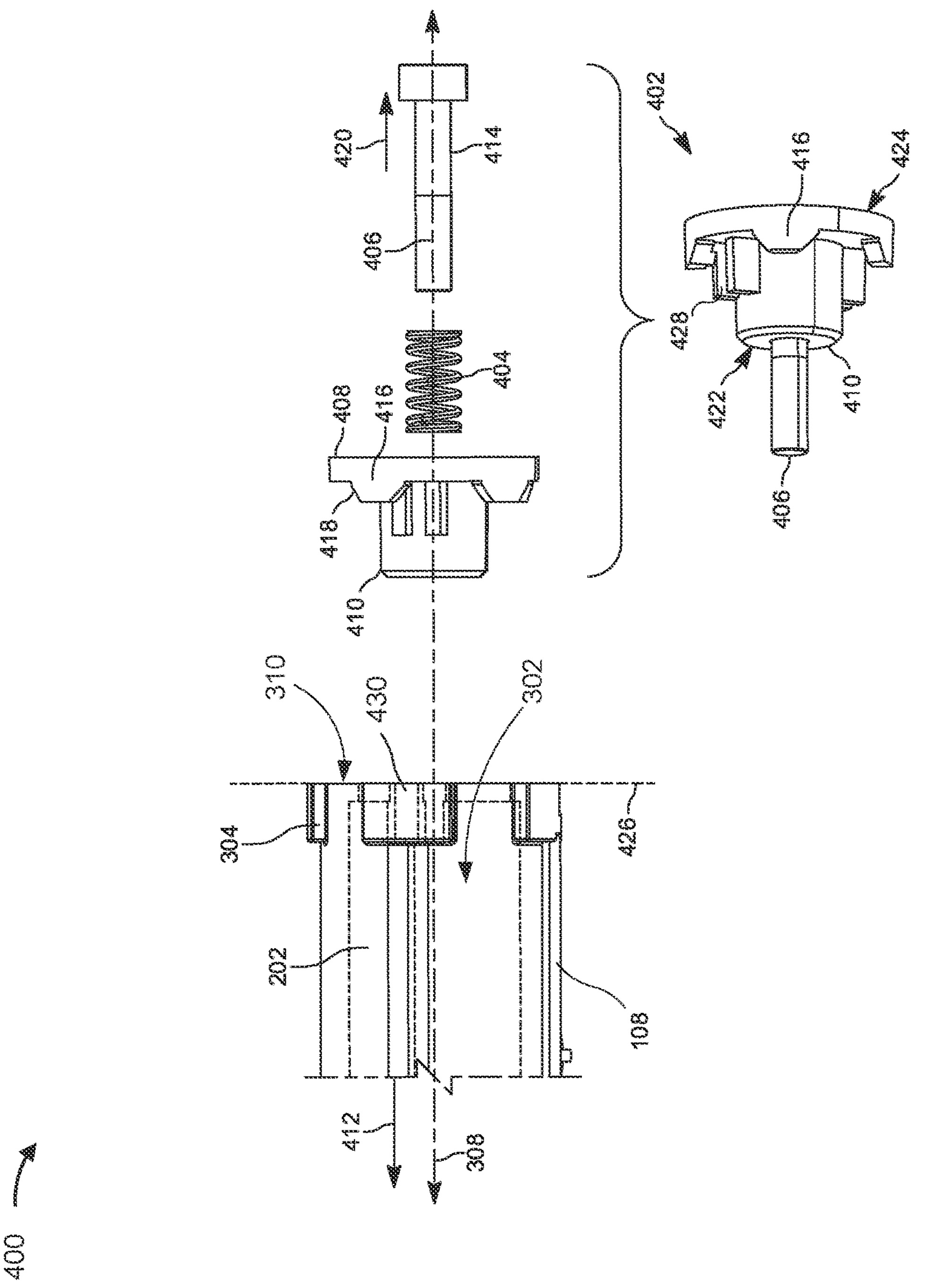
FIG. 4 is a diagram of an example implementation of a retainer described herein.

FIG. 4 is a diagram of an example implementation 400 of a retainer assembly 402 of the print mechanism 102. FIG. 4 includes an exploded view of the retainer assembly 402 and the actuator 108.

The retainer assembly 402 may include a spring 404, a fastener 406, and a retainer 408. The spring 404 may be received within a compartment 410 of the retainer 408. The fastener 406 may be received through the spring 404 (e.g., such that the spring 404 is coiled around the fastener 406) and through an opening in a base of the compartment (e.g., in a center of a proximal end of the retainer 408 that engages with the spring 404) of the retainer 408 and through the spring 404 (such that the spring is coiled around the fastener 406). The fastener 406 may be configured to attach to the support member 202 (shown in FIG. 4 as a dashed line within the actuator 108). For example, the support member 202 may include a threaded opening in a support structure (e.g., a shaft of the support member 202 that attaches to the support frame 204) that enables the fastener 406 to be screwed into the support member 202. The threaded opening and/or the fastener 406 may be axially aligned along the support axis 308 (e.g., an axis of rotation about which the actuator 108 pivots).

In this way, when the retainer assembly 402 is installed within the print mechanism 102 (and/or attached to the support member 202) the fastener 406 and/or the retainer 408 (via the compartment of the retainer 408) may hold the spring 404 within the compartment 410. Furthermore, once the retainer assembly 402 is installed, the spring 404 may be loaded with pressure, thereby causing the retainer 408 to become a pressure-loaded retainer. For example, the spring 404 may be configured to apply the pressure in an inward direction 412 (e.g., toward the support member 202 of the actuator 108) based on being positioned against a head 414 of the fastener 406. In this way, the retainer 408 may be biased via the spring 404.

The retainer 408 may be slidable within the sleeve 302 based on a position of the actuator 108. For example, as shown, the retainer 408 may include a tooth 416 that is to be received by a recess 304 when the actuator 108 (or print mechanism 102) is in an open position. Additionally, or alternatively, the tooth 416 of the retainer 408 may be configured to be engaged with the handle end 310 (or a surface of the handle end 310) of the actuator 108 (which may include or serve as another recess that receives the tooth 416) when the actuator 108 (or print mechanism 102) is in the closed position. Accordingly, the recess 314 may receive the tooth 416 when the print mechanism 102 is in the closed position, and the second recess **304*b* may receive the tooth 416 when the print mechanism 102 is in the open position. A tooth surface 418 of the tooth 416 is configured to slide, as the actuator 108 is rotated between the closed position and the open position, along a cam surface of the cam 206 in an axial direction (e.g., the inward direction 412 or an outward direction 420 that is parallel to the support axis 308**).

The retainer 408 (and/or retainer assembly 402) may have a proximal end 422 and a distal end 424. As shown, the tooth 416 may extend from the distal end 424 toward the proximal end 422. As described herein, in the closed position, the distal end 424 of the retainer 408 may be in an outward position relative to the sleeve 302 and/or an opening plane 426 of the sleeve 302. Furthermore, in the open position, the distal end 424 of the retainer 408 may be in an inward position relative to the sleeve 302 (e.g., positioned nearer the sleeve 302 than when in the closed position).

When the fastener 406 is attached to the support member 202 to attach the retainer assembly 402 to the support member 202, the retainer 408 may be rotationally fixed (e.g., configured not to rotate about the support axis 308) while the actuator 108 is configured to rotate while the retainer 408 engages with (e.g., is slidably in contact with) the cam 306 of the actuator 108. For example, the retainer 408 may include one or more ribs 428 that are configured to be received within corresponding slots 430 of the support member 202. Accordingly, when the ribs 428 are within the slots 430, the retainer 408 may be prevented from rotating (e.g., while the actuator 108 rotates about the support axis 308).

Figure 5:
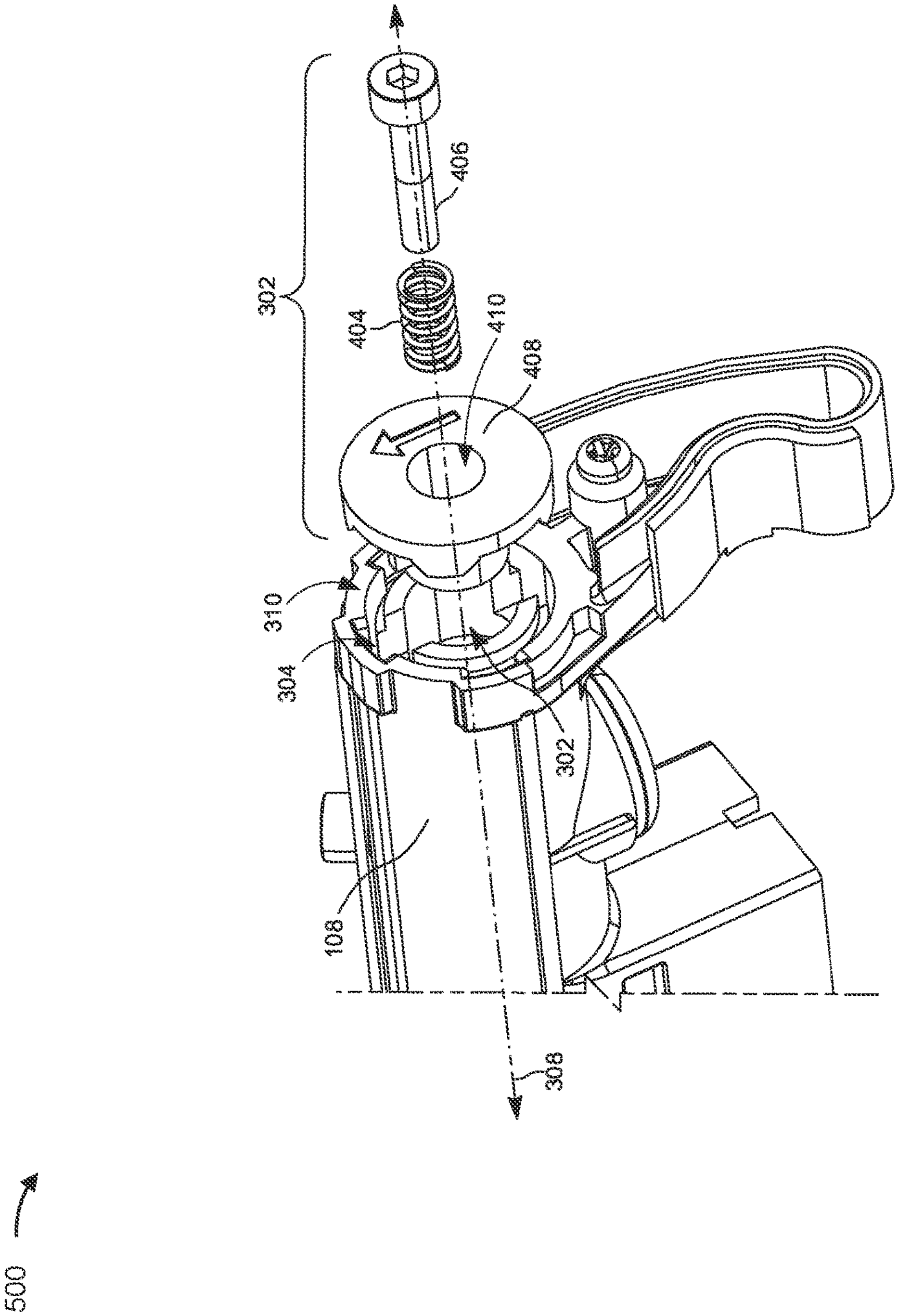
FIG. 5 is a diagram of an example implementation of the retainer of FIG. 4 and the actuator of FIG. 3.

FIG. 5 is an exploded view of an example implementation 500 of the retainer assembly 402 being received within the actuator 108. As shown, the spring 404, the fastener 406, and the retainer 408 are aligned along the support axis 308 as the retainer assembly 402 is received within the sleeve 302 of the actuator 108.

Figure 6:
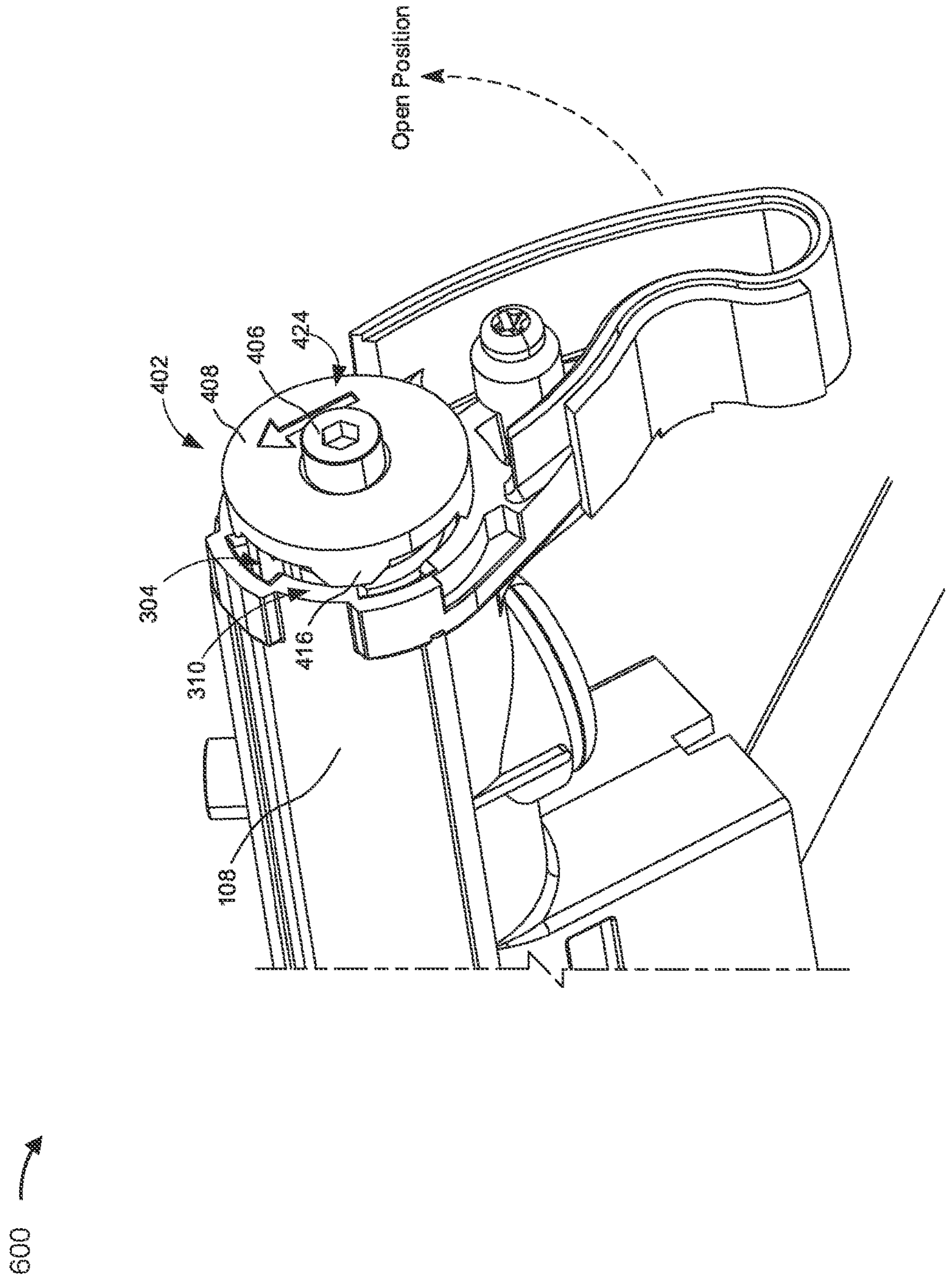
FIG. 6 is a diagram of an example implementation of a retainer associated with a print mechanism in a closed position as described herein.

FIG. 6 is a diagram of an example implementation 600 of the print mechanism 102 in a closed position as described herein. As shown, in the closed position, the retainer assembly 402 is attached to the support member 202 via the fastener 406. In some implementations, in the closed position, the proximal end 422 of the retainer 408 is within the sleeve 302 of the actuator 108 and the tooth 416 may engage or be in contact with the handle end 310 (e.g., at the opening plane 426).

Figure 7:
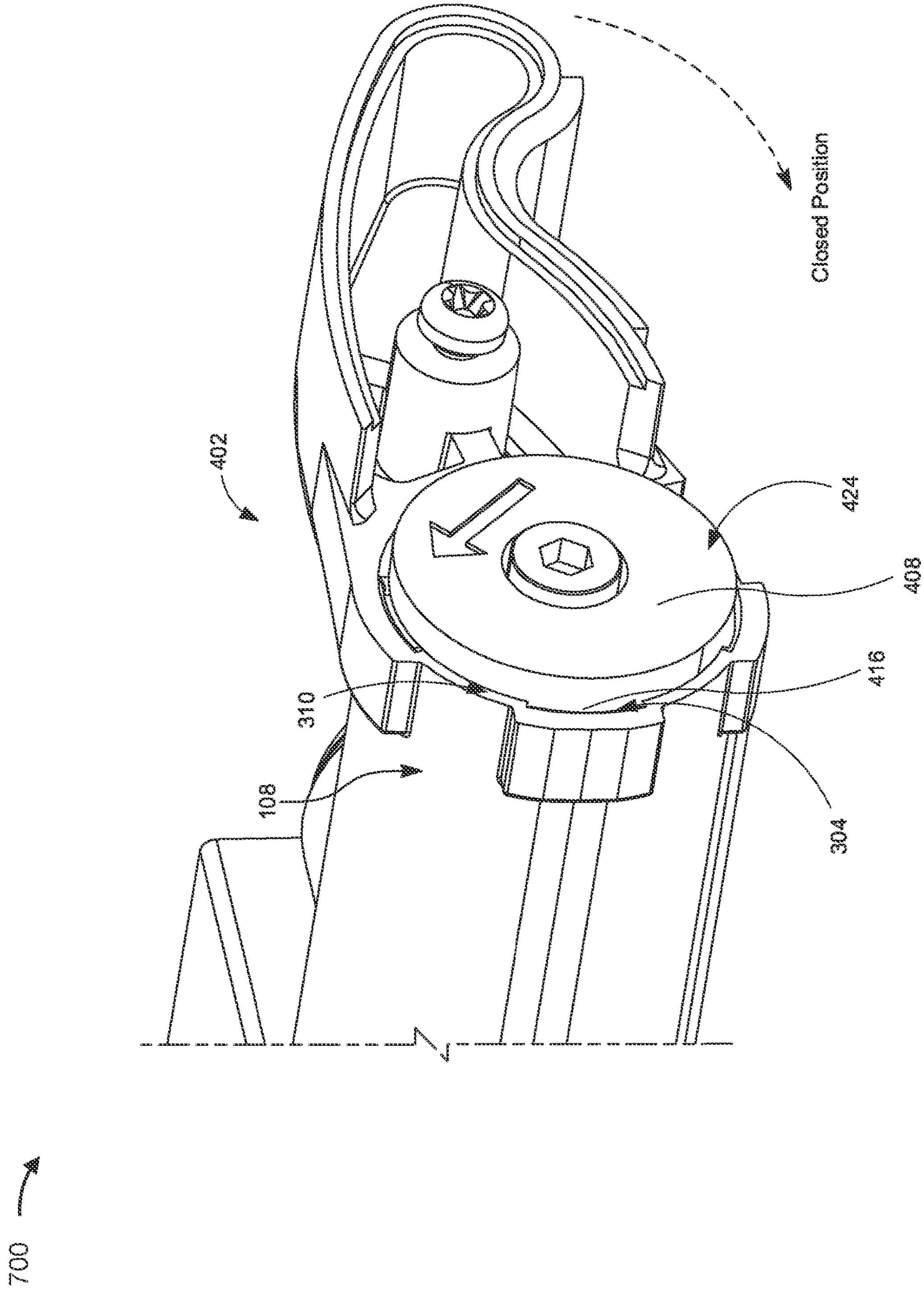
FIG. 7 is a diagram of an example implementation of a retainer associated with a print mechanism in an open position as described herein.

When the actuator 108 is rotated upward toward the open position (as shown by the dotted arrow) the tooth 416 of the retainer 408 may lock in an inward position relative to the sleeve 302 (as shown in FIG. 7), as the retainer assembly 402 moves axially (e.g., along the support axis 308) into the sleeve 302. When the actuator 108 is in the closed position, the tooth 416 of the retainer 408 may lock in an outward position relative to the sleeve 302 (as shown in FIG. 6). The retainer 408 may remain slidable between the inward position and the outward position when the actuator 108 is between the open position and the closed position.

FIG. 7 is a diagram of an example implementation 700 of the print mechanism 102 in an open position as described herein. As shown, in the open position, the retainer assembly 402 is received within the actuator 108 (e.g., within the sleeve 302 of the actuator), such that the distal end 424 of the retainer 408 is nearer the actuator 108 than when the print mechanism 102 is in the closed position (as shown in FIG. 6). For example, the actuator 108 may move axially along the support axis 308 outward or toward the retainer 408 as the actuator 108 is rotated toward the open position.

When the actuator 108 is rotated downward toward the closed position (as shown by the dotted arrow) the tooth 416 of the retainer 408 may lock in an outward position relative to the sleeve 302 (as shown in FIG. 6), as the tooth 416 of retainer assembly 402 moves axially (e.g., along the support axis 308) out of (or away from) the sleeve 302. For example, retainer 408 may move axially along the support axis 308 inward or away from the actuator 108 as the actuator 108 is rotated toward the closed position.

As indicated above, FIGS. 1-7 are provided as an example. Other examples may differ from what is described with regard to FIGS. 1-7. The number and arrangement of devices shown in FIGS. 1-7 are provided as an example. In practice, there may be additional devices, fewer devices, different devices, or differently arranged devices than those shown in FIGS. 1-7. Furthermore, two or more devices shown in FIGS. 1-7 may be implemented within a single device, or a single device shown in FIGS. 1-7 may be implemented as multiple, distributed devices. Additionally, or alternatively, a set of devices (e.g., one or more devices) shown in FIGS. 1-7 may perform one or more functions described as being performed by another set of devices shown in FIGS. 1-7.

The foregoing disclosure provides illustration and description, but is not intended to be exhaustive or to limit the implementations to the precise forms disclosed. Modifications and variations may be made in light of the above disclosure or may be acquired from practice of the implementations.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A pressure mechanism for applying pressure to a printhead in a printer, the pressure mechanism comprising:

a support member defining a support axis and comprising a plurality of slots;

an actuator supported by the support member, the actuator configured to be rotatable about the support axis between a first position and an second position, the actuator comprising:

a handle at a first end;

a sleeve at a second end, the sleeve configured to operably couple to the printhead; and a recess disposed on an end surface of the handle, wherein an edge of the recess forms a cam having a cam surface;

a retainer assembly comprising:

a retainer slidably disposed within the sleeve, the retainer defining a compartment and comprising a base and a plurality of ribs, wherein the plurality of ribs are received within the plurality of slots of the support member to prevent rotation of the retainer relative to the support axis;

a tooth extending from a distal end of the retainer, the tooth having a tooth surface configured to slide along the cam surface in an axial direction as the actuator is rotated;

a spring received within the compartment of the retainer; and a fastener configured to extend through the spring and an opening in the base of the retainer to attach to the support member;

wherein the spring is compressed between against an interior surface of the compartment to bias the retainer in an inward axial direction toward the support member;

wherein, in the first position, the tooth is received by the recess, and the retainer is in an inward axial position such that no force is applied to the printhead;

wherein, in the second position, the tooth surface is in contact with the end surface of the handle, causing the retainer to be in an outward axial position against the bias of the coil spring, and wherein the movement to the outward axial position causes the sleeve of the actuator to apply a force to the printhead in a direction perpendicular to the support axis.

2. The pressure mechanism of claim 1, wherein the retainer is configured to:

lock in the inward axial position relative to the sleeve when the actuator is in the first position, and lock in the outward axial position relative to the sleeve when the actuator is in the second position.

3. The pressure mechanism of claim 1, wherein the actuator further comprises a web pressure mechanism that is configured to apply pressure in a direction that is perpendicular to the support axis.

* * * * *